(12) United States Patent
Williams et al.

(10) Patent No.: US 7,440,975 B2
(45) Date of Patent: Oct. 21, 2008

(54) UNIFIED MEDIA COLLECTION SYSTEM

(75) Inventors: John Williams, Montecito, CA (US); Scott Bahneman, Incline Village, NV (US); Adrian King, Stateline, NV (US)

(73) Assignee: MusicGiants, Inc., Incline Village, NV (US)

( * ) Notice: Subject to any disclaimer, the term of this patent is extended or adjusted under 35 U.S.C. 154(b) by 200 days.

(21) Appl. No.: 11/315,397

(22) Filed: Dec. 21, 2005

(65) Prior Publication Data

US 2006/0136502 A1 Jun. 22, 2006

Related U.S. Application Data

(60) Provisional application No. 60/638,854, filed on Dec. 22, 2004.

(51) Int. Cl.
G06F 17/30 (2006.01)
(52) U.S. Cl. .................... 707/104.1; 707/100
(58) Field of Classification Search .................. 707/10, 707/100, 200, 104.1; 719/328; 725/1, 5; 705/26, 40
See application file for complete search history.

(56) References Cited

U.S. PATENT DOCUMENTS

| | | | |
|---|---|---|---|
| 6,549,922 B1 | 4/2003 | Srivastava et al. | |
| 6,794,566 B2 | 9/2004 | Pachet | |
| 2001/0034733 A1 | 10/2001 | Prompt et al. | |
| 2002/0161741 A1 | 10/2002 | Wang et al. | |
| 2002/0178276 A1 | 11/2002 | McCartney et al. | |
| 2003/0028796 A1 | 2/2003 | Roberts et al. | |
| 2004/0002993 A1 | 1/2004 | Toussaint et al. | |
| 2004/0034441 A1 | 2/2004 | Eaton et al. | |
| 2004/0044742 A1 | 3/2004 | Evron et al. | |
| 2004/0172423 A1 | 9/2004 | Kaasten et al. | |
| 2005/0120053 A1 | 6/2005 | Watson | |
| 2005/0131871 A1* | 6/2005 | Howard et al. .................. 707/3 |
| 2005/0182792 A1* | 8/2005 | Israel et al. .............. 707/104.1 |

FOREIGN PATENT DOCUMENTS

WO WO 02/054769 7/2002

* cited by examiner

*Primary Examiner*—Cheryl Lewis
(74) *Attorney, Agent, or Firm*—Cislo & Thomas, LLP

(57) ABSTRACT

A unified media collection system comprises a local user agent with a primary metadata repository, and at least one foreign user agent with a secondary metadata repository. The secondary metadata repository is operatively coupled to the primary metadata repository. The local user agent is configured to compare the primary and secondary metadata repositories to identify missing media content available for purchase. The local user agent is also configured to purchase the identified missing media content to complete at least one media collection. The local user agent is adapted to deselect items from a list of identified missing media content for purchase, as needed. The local user agent is further configured to compare and keep the primary and secondary metadata repositories synchronized and up-to-date.

42 Claims, 5 Drawing Sheets

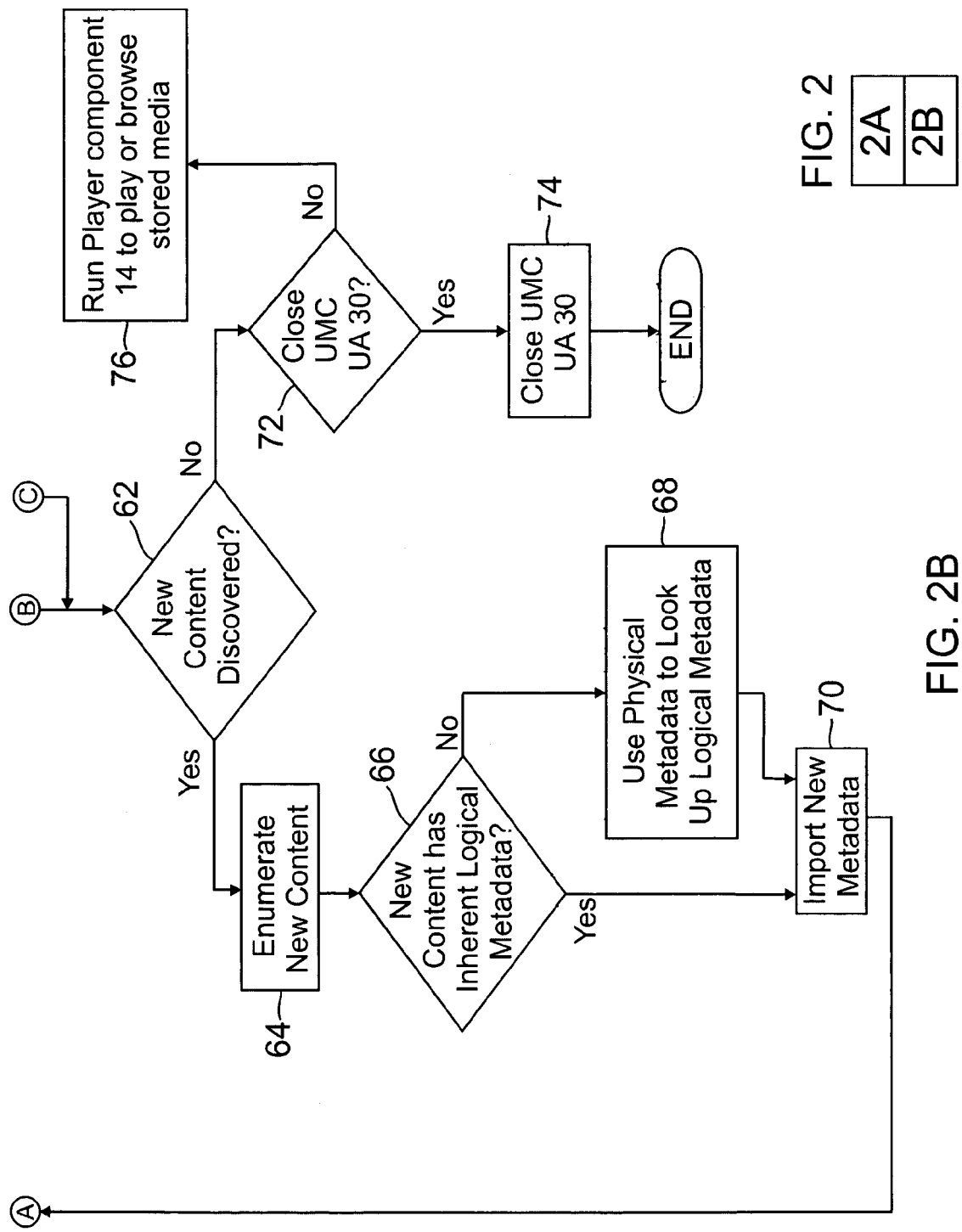

UNIFIED MEDIA COLLECTION SYSTEM

CROSS REFERENCE TO RELATED APPLICATIONS

This utility patent application claims the benefit of U.S. Provisional Patent Application No. 60/638,854, filed on Dec. 22, 2004, which is incorporated herein in its entirety by reference.

BACKGROUND

The term "content" refers to any original work of art in all its forms, e.g. musical compositions, or more broadly, audible content, video content with or without an audio component, any type of visual art such as paintings, novels, and/or the like. The term "metadata" refers to any information which describes, but does not embody, content. Specifically, metadata describes how, when and by whom a particular set of data was collected, and how the data is formatted. Metadata may describe characteristics of either logical or physical data.

Logical data generally refers to the actual content of the work of art in its most raw form, the spontaneous output of its creator, e.g. the score of a musical composition without regard to a specific performance, or the text of a novel. Physical data refers to a specific performance of content, e.g. a sound recording of a specific performance distributed in one of several different forms, i.e. as one or more tracks on a CD (Compact Disc), or as a computer file. Other examples of physical data may include the actual painting itself or a print, or for a novel, the actual physical book.

Metadata describing logical data is usually determined by the creator of the content. For example, the date of creation of a musical composition, the name of the composer, the title of the composition, the musical genre to which the composition belongs, or the title of a painting, the name of the painter, the relevant style/period, or the title of a novel, the name of the author, and the number and titles of various chapters would all be described by logical metadata.

Metadata describing physical data is usually determined by the distributor of the content. For example, for a recording of a particular performance, the playing time, the recording date, and the name(s) of the performer(s) would be described by physical metadata. Such physical metadata may be independent of the distribution medium. Medium-dependent physical metadata may include, for example, the number of tracks on a CD and the track number where a particular content may be found, or the name of a computer file, its size, bit rate and codec used to encode content in the file. Medium-dependent physical metadata may also include the size of a painting canvas or print and the materials involved, or the binding of a novel, the number of pages in the novel, and the page numbers where respective chapters start, etc.

User agent ("UA") refers to a device which facilitates the consumption of content-related physical data and, in some cases, converting content from one form of physical data to another (e.g. 'burning' or 'ripping' a CD). For example, in the case of paintings and novels, the physical data itself is the UA in that prints and books are ready to be consumed directly by their audience. In regard to audible content, the UA may be a piece of computer software, commonly called "media player" or the like. Such UAs contain a component capable of rendering physical data into audible form (hereinafter referred to as 'Player') and, to varying degrees, internal storage for metadata (metadata repository).

The term "ingestion" refers to the process of a UA becoming aware of content, and, depending on the particular UA, recording and managing metadata about the same. An Application Programming Interface ("API") refers to any of several different ways that a UA may expose its functionality for use by another UA.

Media users typically desire to purchase new media such as CDs, DVDs, VHS tapes, paintings, books and the like, but would generally prefer not to repurchase media that they already own. For example, a media user may have to purchase the entire CD of a particular artist in order to obtain possession of only two or three songs (tracks) that are needed to complete his/her collection of that artist as no media source with just these two or three songs (tracks) may be available for purchase. The need exists, therefore, for a media collection functionality that would make it possible for media users to easily and efficiently identify missing media content, and purchase any identified missing content to complete their media collection without incurring unnecessary extra costs. It would be desirable to have such functionality made applicable to any type of digital media.

SUMMARY

Exemplary embodiments disclosed herein are generally directed to a unified media collection system.

In accordance with one aspect of the invention, the unified media collection system comprises a local user agent with a primary metadata repository, and at least one foreign user agent with a secondary metadata repository. The secondary metadata repository is operatively coupled to the primary metadata repository. The local user agent is configured to compare the primary and secondary metadata repositories to identify missing media content available for purchase. The local user agent is also configured to purchase the identified missing media content to complete at least one media collection. The local user agent is adapted to deselect items from a list of identified missing media content for purchase, as needed.

In accordance with another aspect of the invention, the unified media collection system comprises a local user agent with a primary metadata repository, and at least one foreign user agent with a secondary metadata repository. The secondary metadata repository is operatively coupled to the primary metadata repository. The local user agent is configured to compare and keep the primary and secondary metadata repositories synchronized and up-to-date.

In accordance with yet another aspect of the invention, the unified media collection system comprises a first foreign user agent, a local user agent having a primary metadata repository and being adapted to interact with the first foreign user agent, and a second foreign user agent having a secondary metadata repository operatively coupled to the primary metadata repository. The local user agent is configured to compare and keep the primary and secondary metadata repositories synchronized and up-to-date.

Exemplary embodiments disclosed herein are also generally directed to a method for consolidating and unifying logical and physical metadata about media content from a plurality of sources.

In accordance with one aspect of the invention, the method comprises the steps of:

(a) launching a local user agent;

(b) checking for new content in at least one foreign user agent, wherein the local user agent subscribes to metadata changes from the foreign user agent;

(c) importing and translating metadata for new content from the format used by the foreign user agent into format used by the local user agent if there is new content in the foreign user agent; and (d) propagating the imported metadata to other user agents.

In accordance with another aspect of the invention, the method comprises the steps of:

(a) launching a local user agent, wherein the local user agent includes a primary metadata repository;

(b) checking for new content in at least one foreign user agent, wherein the local user agent subscribes to metadata changes from the foreign user agent;

(c) checking for new content introduced directly to the local user agent if there is no new content in the foreign user agent;

(d) translating new metadata if new content has been introduced directly to the local user agent;

(e) checking if any new content has been discovered in any of the file system directories subscribed to by the local user agent if no new content has been introduced directly to the local user agent;

(f) enumerating newly discovered content;

(g) checking whether the enumerated new content has inherent logical metadata;

(h) retrieving physical metadata from the enumerated new content if no inherent logical metadata is found; and (i) importing new logical metadata into the primary metadata repository if inherent logical metadata is found.

These and other aspects of the invention will become apparent from a review of the accompanying drawings and the following detailed description of the invention.

BRIEF DESCRIPTION OF THE DRAWINGS

The invention is generally shown by way of reference to the accompanying drawings in which:

FIGS. 2A-2B is an exemplary operational flow chart of the unified media collection system of FIG. 1;

DETAILED DESCRIPTION

Figure 1:
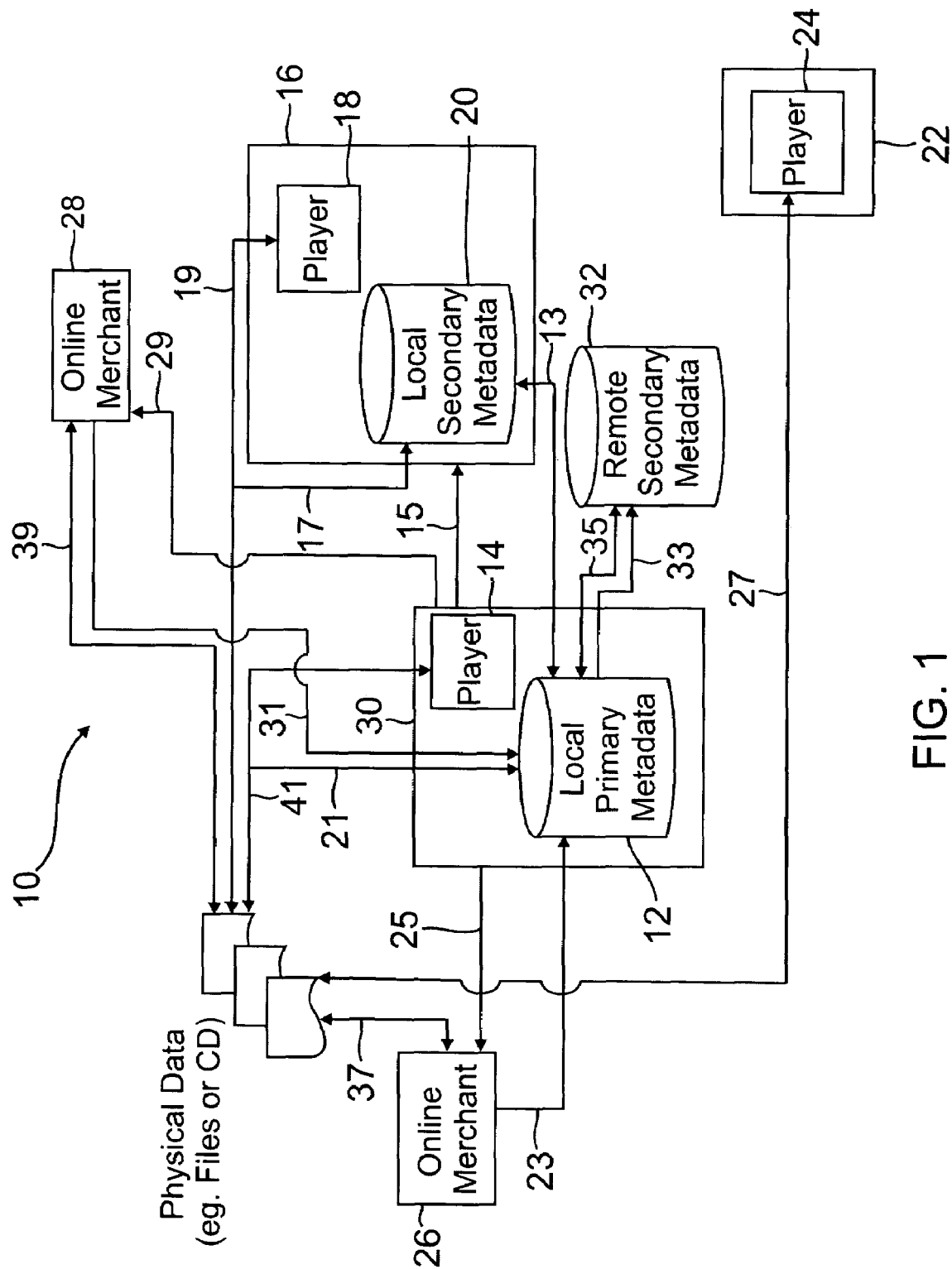
FIG. 1 is a block diagram of a unified media collection system in accordance with an exemplary embodiment of the present invention.

The detailed description set forth below in connection with the appended drawings is intended as a description of exemplary embodiments and is not intended to represent the only forms in which the exemplary embodiments may be constructed and/or utilized. The description generally sets forth the functions and/or sequence of steps for constructing and operating the exemplary embodiments in connection with the illustrated embodiments. However, it is to be understood that the same or equivalent functions and/or sequences of steps may be accomplished by different embodiments that are also intended to be encompassed within the spirit and scope of the invention.

Some embodiments of the invention will be described in detail with reference to the related drawings of FIGS. 1-4. Additional embodiments, features and/or advantages of the invention will become apparent from the ensuing description or may be learned by practicing the invention. In the figures, the drawings are not to scale with like numerals referring to like features throughout both the drawings and the description.

The present invention is generally directed to a unified media collection ("UMC") system 10 (FIG. 1) configured to consolidate and unify logical and physical metadata about digital media content from various sources for the purpose of facilitating acquisition and consumption of the same. UMC system 10 is also configured to consolidate and unify rights management metadata about digital media content from various sources. Nearly all digital media content is protected against unauthorized use by various laws. For purposes of describing the present invention, authorized uses are generally referred to as "rights," and the management thereof as "rights management." Logical content is protected almost from the moment of creation by law. Physical content is protected upon distribution to its audience by various schemes.

There currently exist various distinct and competing popular UAs, all of which, to various degrees, have the ability to ingest content and store metadata about the same. Unfortunately, UAs are often unaware of each other's metadata, and even content compatible with each of them must be ingested separately by each of them. Some UAs include a facility to add content by purchasing computer-file-type physical data from retailers on the Internet ('online'), ingesting the same as it is purchased. UAs are generally not aware of new content purchased via other UAs, unless they, too, are prompted to ingest the new content. Moreover, rights-related restrictions to media which are designed to be interpreted and honored by a particular UA are not generally interpreted and honored by other UAs, allowing for the inappropriate, accidental or intentional, use of not-truly-assigned rights.

UMC system 10 acts as a bridge between disparate UAs (UAs that would otherwise be mutually incompatible) by providing a single repository for metadata collected from them, and translating seamlessly among them. Particularly, UMC system 10 utilizes a local user agent (UA) 30 (FIG. 1) which includes a primary metadata repository 12 (FIG. 1), whose structure is focused on content itself, rather than the needs of specific foreign UAs, and a media player component 14 (FIG. 1) operatively coupled to local UA 30. Player component 14 may be adapted to run digital media of any kind, as needed.

There may be several kinds of objects, each having at least the following inherent logical metadata properties:

Album
   Album Title
   Label (distributor of the physical metadata)
   Where available, cover art. Album cover art and artist portrait may be considered not only metadata about an album or an artist, respectively, but may also represent content in their own right. Specifically, these are visual works of art that are manifested physically as computer image files.

Track
   Track Title
   Playing Time

Artist
   Artist Name
   Where available, portrait of the artist

Genre
   Genre Name

Style
   Style Name

Play list
   Play list Name

In addition, these objects may be related to each other in the following ways:

An album has one or more tracks with the number of tracks being a calculable, but not inherent, property of the album.

An album has exactly one artist as its primary artist.

An album has one or more artists as contributing artists.

An album has exactly one style.

A track belongs to exactly one album.

A track has one or more artists as performers.

A track has one or more artists as composers.

A style, since it can be considered a 'sub-genre', belongs to exactly one genre.

A play list has one or more tracks, and the relative order of those-tracks is a property of the play list.

Items of physical metadata which are present depend on the form of the physical data. For CDs, an album corresponds to one or more physical discs. A track corresponds to one physical track on the disc with the track number being stored as metadata on the disc. For computer files, an album may correspond to one folder in the computer file system with the full path to that folder being stored in metadata. A track corresponds to one file in the computer file system with the full path to that file being stored in metadata.

Attributes related to the technology used to convert the content to the file at hand often include information such as bit rate and codec. The term "codec" generally refers to a coder/decoder device or program that compresses or decompresses a data stream. An audio codec, for example, is a computer program that compresses/decompresses digital audio data according to a given audio file or streaming audio format. Most codecs are implemented as libraries which interface to one or more multimedia players, such as Winamp® or Windows Media Player®. A play list may correspond to a file in the computer file system, which itself is a form of metadata in that it typically consists of a list of the full paths to the play list's tracks corresponding to physical data files.

UMC system 10 also utilizes foreign UAs, which in addition to their inherent media player component may include an internal metadata repository. Some UAs, however, may only include a media player component. For example, foreign UA 16 (FIG. 1) includes a media player component 18 and a local (secondary) metadata repository 20, while foreign UA 22 (FIG. 1) only includes a media player component 24. Foreign UA 16 exposes its functionality and local (secondary) metadata repository 20 to other entities such as local UA 30 via an appropriate API. Each player component (18, 24) may be adapted to run digital media of any kind.

Local UA 30 is configured to compare and keep its own primary metadata repository 12 and local secondary metadata repository 20 (of UA 16) up-to-date and synchronized by calling the respective API exposed by UA 16, as shown by directional arrow 15 (FIG. 1), to subscribe to changes to foreign metadata contained in local secondary metadata repository 20. Movement of metadata in this regard between local secondary metadata repository 20 and local primary metadata repository 12 is schematically shown by directional arrow 13 (FIG. 1). The changes to foreign metadata may be from ingestion of metadata by local secondary metadata repository 20 (of UA 16), as shown by directional arrow 17 (FIG. 1) due to purchase of new physical data, as shown by directional arrow 19 (FIG. 1) or conversion of data from one physical form to another (typically, 'ripping' a CD). The purchased physical data may be used by media player component 14 (FIG. 1). The changes to foreign metadata may also be from improved or updated logical metadata about existing content, or from updated physical metadata about existing content, e.g. when a file is moved by UA 16.

Local UA 30 is also configured to push changes to metadata initiated from within itself to UA 16 by calling the respective API exposed by UA 16, as shown by directional arrow 15 (FIG. 1). Such changes may involve direct ingestion of newly-discovered existing content by UA 30, as shown by directional arrow 21 (FIG. 1), or purchase of new content from an associated online store, such as online merchant 26 (FIG. 1). Ingestion of metadata by local primary metadata repository 12 due to purchase of new content is shown by directional arrow 23 (FIG. 1). In the latter case, local UA 30 calls the respective API exposed by online merchant 26, as shown by directional arrow 25 (FIG. 1).

Foreign UAs that do not have their own internal metadata store, such as UA 22 (FIG. 1), which only contains a media player component 24 (FIG. 1), may retrieve and/or and render physical data, as shown by directional arrow 27 (FIG. 1), via the computer file system. The computer file system defines the directory structure for keeping track of computer files and the path syntax required to access the same. It also defines the way files are named as well as the maximum size of a file or volume. FAT, FAT32 and NTFS are examples of file systems used on PCs (Personal Computers). For example, local UA 30 interacts with foreign UA 22 through the computer file system, i.e. foreign UA 22 sees additions or changes to physical data by looking at the actual physical files stored on the computer file system.

Local UA 30 compares and keeps its metadata up-to-date and synchronized with online merchants 26, 28 (FIG. 1) by subscribing to online merchant metadata changes, such as additional content being made available for sale, or being removed from availability, etc. In regard to online merchant 28, local UA 30 calls the respective API exposed by online merchant 28, as shown by directional arrow 29 (FIG. 1). Ingestion of metadata due to purchase of new content from online merchant 28 is shown by directional arrow 31 (FIG. 1).

Figure 3:
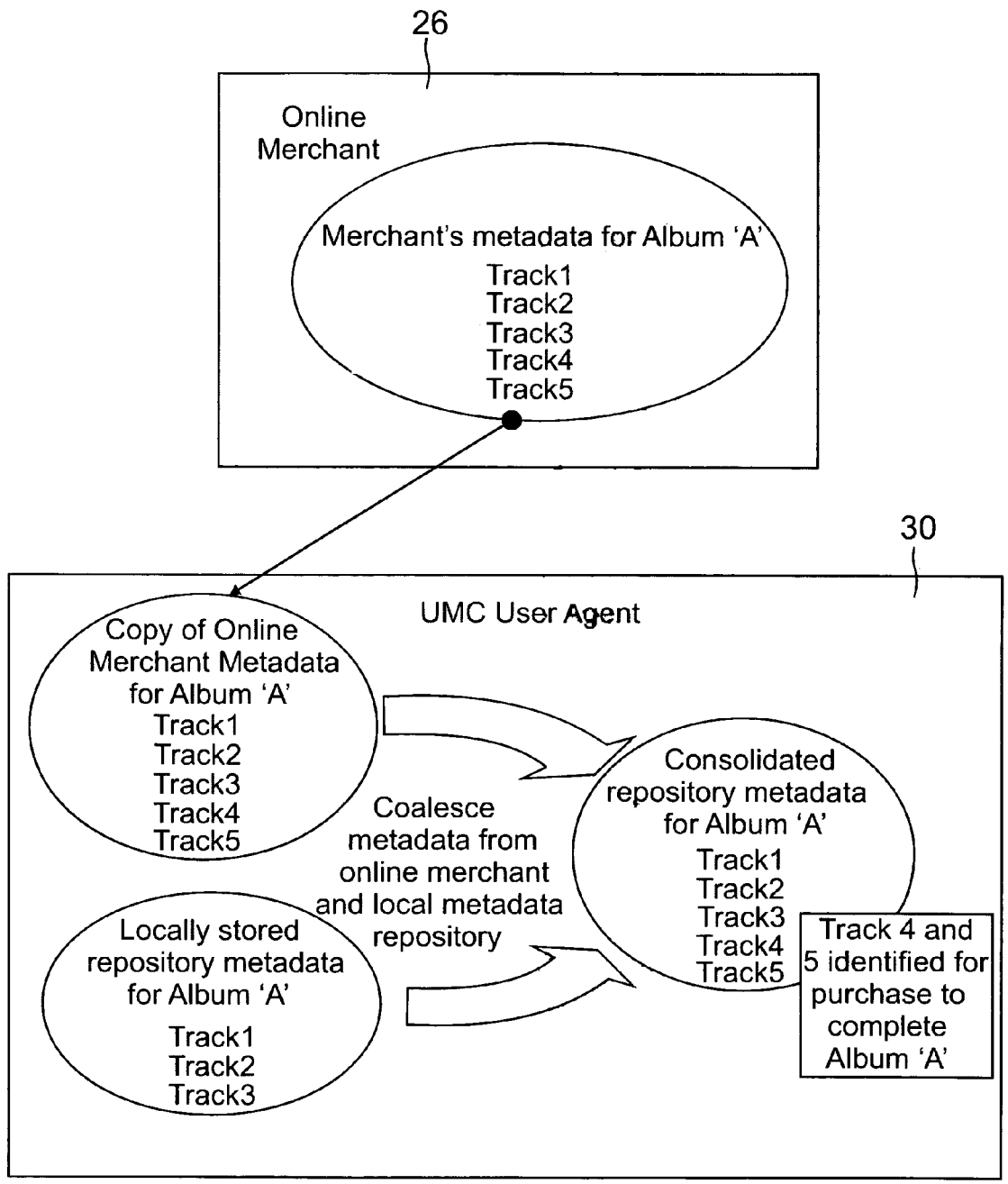
FIG. 3 is an exemplary operational block diagram of the unified media collection system of FIG. 1.

Synchronization may entail, for example, a comparison between physical content associated with a particular artist and/or album that exists locally with content available from an online merchant for the same artist and/or album. For some online merchants, this synchronization allows local UA 30 to purchase and ingest all 'missing' content with a single interaction, as generally depicted in FIG. 3, to complete its media collection. For example (but not by limitation), in FIG. 3, online merchant 26 contains metadata for a sample album called 'A'. UMC UA 30 has metadata (in its primary metadata repository 12), however, only for some of the tracks that belong to album 'A'. Local UA 30 needs to synchronize its metadata with online merchant 26. Online merchant 26 provides metadata information to UA 30 on the entire content of album 'A'. Local UA 30 coalesces metadata from online merchant 26 and its primary metadata repository 12 to identify missing content (tracks 4-5). Specifically, tracks 4-5 are identified for purchase by UA 30 (FIG. 3) in order to complete album 'A'.

This functionality of easily and efficiently completing a media collection with a single interaction, as embodied and made available to media users by UMC system 10 of the present invention, may be used with any collection of audio files, such as albums, artists, genres, or styles, as well as with collections of various other types of digital media such as, for example, video collections, image collections and the like. Moreover, once presented with a list of missing content, UMC system 10 is adapted to allow the user the ability to deselect some items that were identified, but not deemed desirable enough to warrant the cost of purchase.

A third party may provide online access to a remote (secondary) metadata repository 32 which may contain logical metadata for all existing musical content. Local UA 30 compares and keeps its primary metadata repository 12 up-to-date and synchronized with the third party by calling the respective API exposed by remote metadata repository 32, as shown by directional arrow 33 (FIG. 1), and allowing manual and/or automatic ingestion of metadata changes to remote secondary metadata repository 32 that local UA 30 subscribes to. Movement of metadata between remote metadata repository 32 and local UA 30 is shown by directional arrow 35 (FIG. 1).

Local UA 30 is configured to compare and keep all online merchant and foreign UA internal metadata repositories (where present) up-to-date and synchronized. UA 30 calls the API exposed by each foreign UA to push metadata collected from its subscription to one foreign UA's metadata repository to all other foreign UAs, subject to rights management criteria, as schematically shown in FIG. 1. Online merchants 26, 28 are configured to retrieve or change physical data, as generally depicted by directional arrows 37, 39, respectively. Local UA 30 is adapted to retrieve physical data for use by player component 14, as generally shown by directional arrow 41 (FIG. 1).

Player component 14 and primary metadata repository 12 of local UA 30 are configured to honor restrictions on rights as imposed by several different technologies, whether discovered during direct ingestion, by subscription to foreign UA metadata, or delivered with new content purchased online. If UA 30 determines that a foreign UA is either unlikely to be compatible with a particular rights management technology, or unlikely to honor the required restrictions, metadata, whatever the source, about the affected content will not be propagated to that UA.

Figure 4:
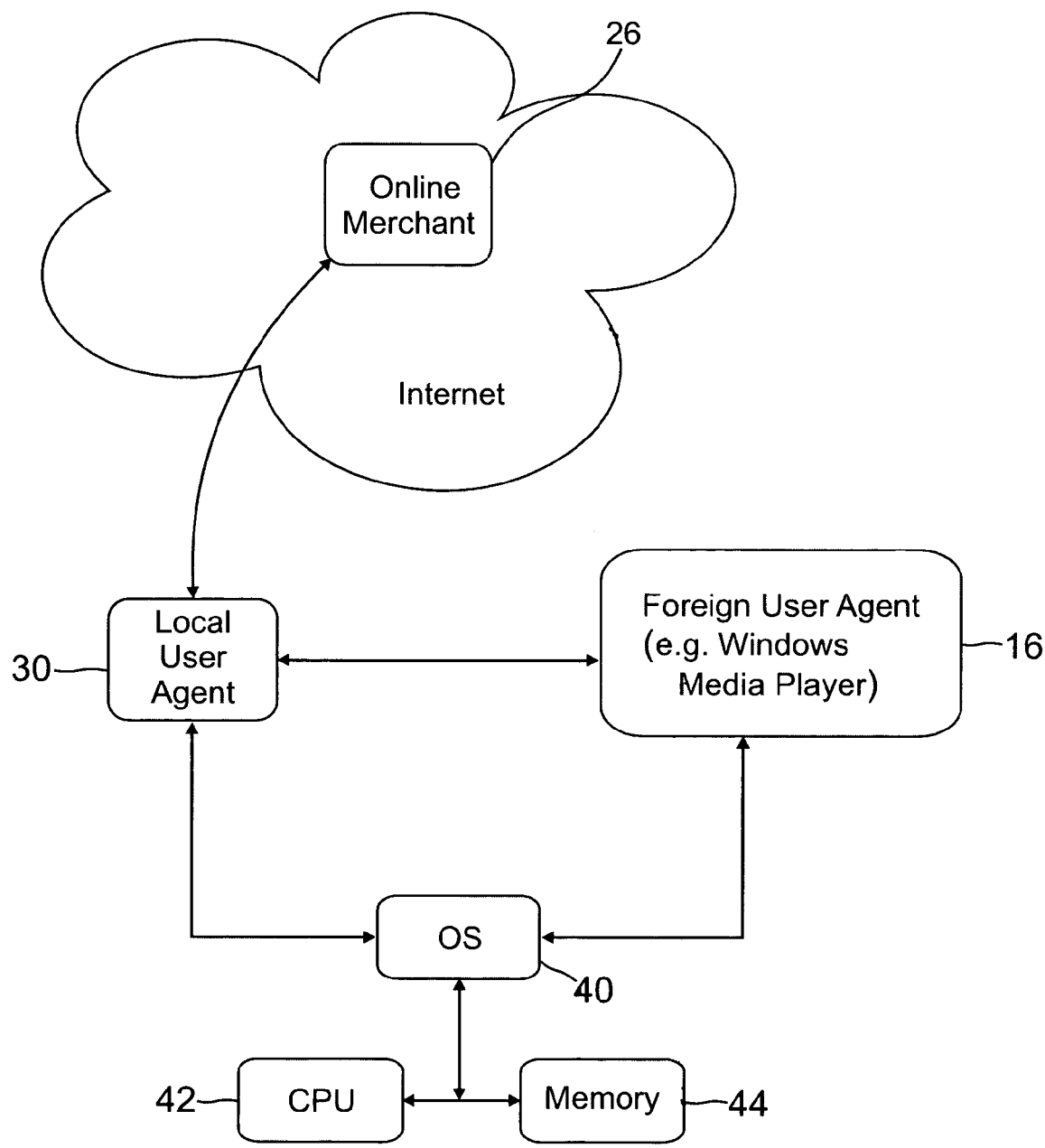
FIG. 4 is another exemplary operational block diagram of the unified media collection system of FIG. 1.

FIG. 4 is an exemplary operational block diagram of UMC system 10. Particularly, local UA 30 and foreign UA 16 reside on the same computer and exchange metadata, as needed. Local UA 30 and foreign UA 16 may be implemented as applications in software form to run on top of OS (Operating System) 40. OS 40 is operatively coupled between computer memory module 44 and CPU 42. Local UA 30 communicates with a remote online merchant 26 via the Internet or any other suitable network environment. A person skilled in the art would readily appreciate that CPU 42, memory module 44, OS 40, local UA 30 and foreign UA 16 may be operatively implemented on any device with processing and/or media storage and/or playback capability such as, for example (but not by limitation), PC, workstation, laptop, tablet PC, mobile PC, media server, set top box, DVD or CD player with read/write capability and/or the like.

Figure 2A:
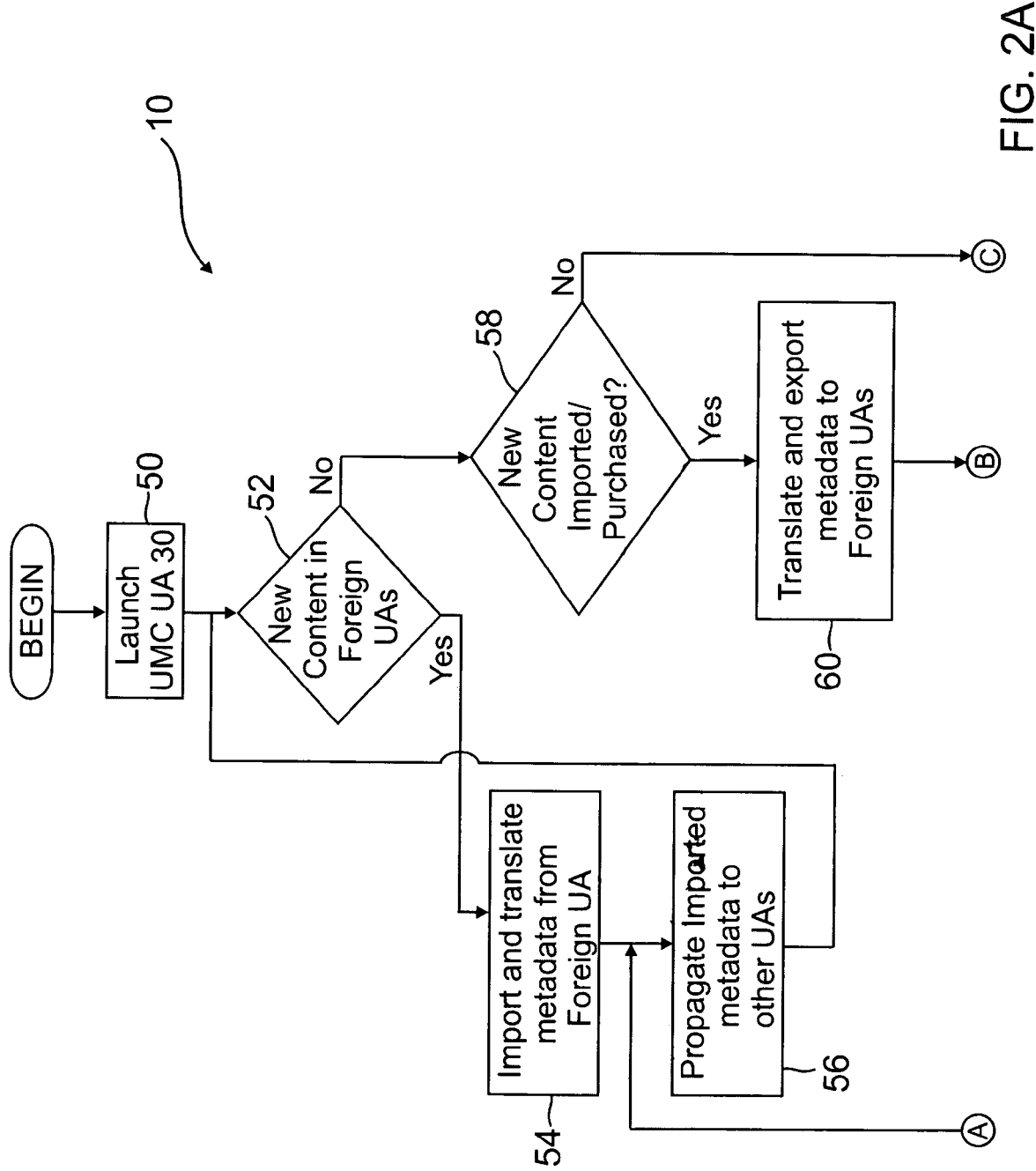

In accordance with an exemplary embodiment of the present invention, UMC system 10 is configured to perform the following operational steps (as schematically shown in FIG. 2):

1. Launch UMC UA 30 (step 50).
2. UMC UA 30 checks if there is new content in foreign UAs to whose metadata it has subscribed (step 52).
3. If there is new content in foreign UA(s), UMC UA 30 imports and translates metadata for new content from the format used by the foreign UAs into its own format (step 54). For example, if a new track is present in a foreign UA, and the foreign UA stores a track's title as 'song title', UMC UA 30 will map 'song title' to 'track title' to store that information. Particularly, UMC UA 30 calls the respective API exposed by the foreign UA and ingests metadata from the same.
4. Thereafter, UMC UA 30 propagates the imported metadata to other UA(s) (step 56) and repeats step 52.
5. If there is no new content in foreign UAs, UMC UA 30 checks if there is new content introduced directly to it, i.e. either by direct manual import or purchase from an online merchant (step 58) that may need propagation to other UAs.
6. If there is new imported/purchased content, UMC UA 30 translates the new metadata from the format stored in the foreign UAs to the format UMC UA 30 uses in its own metadata repository 12 and exports metadata for new content to foreign UAs (step 60) by calling their respective APIs and writing metadata to the same.
7. If there is no new imported/purchased content, UMC UA 30 checks if any new content has been discovered (step 62) in any of the file system directories or removable media it has subscribed to.
8. If such new content has been discovered, UMC UA 30 enumerates the newly discovered content (step 64), i.e. makes a temporary list of the newly discovered content for further processing, and for each piece of new content.
9. In step 66, UMC UA 30 checks if the enumerated new content has inherent logical metadata (e.g., Windows Media™ audio file attributes, or MP3 ID3 tags—given here by example and not by limitation). ID3 tagging generally refers to the process of including information other than sound in digital audio files. The original standard for tagging digital files was developed in 1996 and was coined the term "ID3." At that time "ID3" simply meant "IDentify and MP3." The ID3 tag standard is fairly wide spread with implementation libraries being readily available.
10. If there is no inherent logical metadata, UMC UA 30 retrieves physical metadata from the enumerated new content and uses the same to look up logical metadata (step 68) from remote secondary metadata repository 32, by calling one or more of its APIs and reading metadata from the same.
11. If there is inherent logical metadata, UMC UA 30 imports the new logical metadata (step 70) into primary metadata repository 12, and repeats step 56.
12. If no new content has been discovered, UMC UA 30 sends an inquiry to the user whether it should be closed (step 72).
13. If the answer is in the affirmative, UMC UA 30 turns itself off (step 74).
14. If the answer is in the negative, UMC 30 runs its media player component 14 to play or browse stored media (step 76), as desired by the user.

UMC system 10 is designed to be extensible, by allowing the introduction of compatibility with new foreign UAs, especially UAs that have internal metadata repositories and expose an API, after a suitable period of analysis of their respective APIs and/or metadata formats. UMC system 10 is also designed to be a single source of metadata for all digital media content, whether existing locally, or potentially existing in the future as the result of a purchase.

UMC system 10 distinguishes itself among known media collection systems by allowing disparate systems to communicate with itself and/or each other that would otherwise be unable to do so. UMC system 10 distinguishes itself yet further by consolidating collections of media stored locally on a user agent's computer, device with processing capability or any other media storage device (with or without playback capability) with media content available for purchase from an online merchant, thereby greatly simplifying the task of acquiring new content.

The consolidation of metadata describing locally owned content and content available for sale by online merchant(s) facilitates new ways to purchase collections of media for sale by automatically identifying the items that the user does not already own. The metadata subscription to online repositories allows the local UA to have knowledge of not only which media items are located in foreign UA repositories, but also which content is available from the online merchant(s) that is not already contained in the repositories of all UAs.

A person skilled in the art would appreciate that exemplary embodiments described hereinabove are merely illustrative of the general principles of the present invention. Other modifications or variations may be employed that are within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

What is claimed:

1. A unified media collection system, comprising:
   a local user agent having a media player and a primary metadata repository, said primary metadata repository having first data regarding a first media collection; and
   at least one foreign user agent having a secondary metadata repository operatively coupled to said primary metadata repository, said secondary metadata repository having second data regarding said first media collection; and
   said local user agent configured to compare and keep said primary and secondary metadata repositories synchronized and up-to-date; whereby
   content missing from said first media collection is identified by said local user agent and said foreign user agent interaction upon comparison of said primary metadata repository with said secondary metadata repository.

2. The unified media collection system of claim 1, wherein said local user agent is further configured to push changes to said primary metadata repository initiated from within itself to said at least one foreign user agent.

3. The unified media collection system of claim 2, wherein changes to said primary metadata repository involve said local user agent calling a respective API (Application Programming Interface) exposed by said at least one foreign user agent.

4. The unified media collection system of claim 3, wherein changes to said primary metadata repository involve direct ingestion of newly-discovered existing content by said local user agent.

5. The unified media collection system of claim 3, wherein changes to said primary metadata repository involve purchase of new content from at least one online merchant.

6. The unified media collection system of claim 5, wherein the purchase of new content involve said local user agent calling a respective API (Application Programming Interface) exposed by said at least one online merchant.

7. The unified media collection system of claim 1, wherein said local user agent is adapted to subscribe to changes to foreign metadata contained in said secondary metadata repository.

8. The unified media collection system of claim 7, wherein said changes to foreign metadata result from ingestion of metadata by said secondary metadata repository.

9. The unified media collection system of claim 8, wherein said ingestion of metadata is due to purchase of new physical data by said secondary metadata repository.

10. The unified media collection system of claim 9, wherein said purchased physical data being used by said media player.

11. The unified media collection system of claim 8, wherein said ingestion of metadata is due to conversion of data from one physical form to another by said secondary metadata repository.

12. The unified media collection system of claim 7, wherein said changes to foreign metadata result from updated logical metadata about existing content.

13. The unified media collection system of claim 7, wherein said changes to foreign metadata result from updated physical metadata about existing content.

14. The unified media collection system of claim 1, wherein said local user agent and said at least one foreign user agent are operatively implemented on one media storage and playback device.

15. The unified media collection system of claim 14, wherein said local user agent and said at least one foreign user agent are implemented as applications in software form to run on top of a computer OS (Operating System).

16. The unified media collection system of claim 15, wherein said OS is operatively coupled between a computer memory module and CPU (Central Processing Unit).

17. The unified media collection system of claim 15, wherein said local user agent is adapted to communicate with at least one remote online merchant via a network environment.

18. The unified media collection system of claim 14, wherein said local user agent and said at least one foreign user agent are implemented as applications in software form to run on top of a OS (Operating System) of a device having processing capability.

19. The unified media collection system of claim 1, further comprising at least one remote secondary metadata repository from an online third party, said at least one remote secondary metadata repository being operatively coupled to said local user agent for identifying content needed to complete a collection of at least one type.

20. A unified media collection system, comprising:
    a first foreign user agent;
    a local user agent having a media player and a primary metadata repository, said local user agent being adapted to interact with said first foreign user agent, said primary metadata repository having first data regarding a first media collection; and
    a second foreign user agent having a secondary metadata repository operatively coupled to said primary metadata repository, said secondary metadata repository having second data regarding said first media collection; and
    said local user agent configured to compare and keep said primary and secondary metadata repositories synchronized and up-to-date; whereby
    content missing from said first media collection is identified by said local user agent and said foreign user agent interaction upon comparison of said primary metadata repository with said secondary metadata repository.

21. The unified media collection system of claim 20, wherein each of said first foreign user agent, said local user agent, and said second foreign user agent includes a media player component.

22. The unified media collection system of claim 21, wherein said first foreign user agent is adapted to retrieve and render physical data via an associated computer file system.

23. The unified media collection system of claim 22, wherein said local user agent interacts with said first foreign user via the computer file system.

24. The unified media collection system of claim 21, wherein each of said first foreign user agent, said local user agent, and said second foreign user agent is configured to retrieve physical data for use by the media player.

25. The unified media collection system of claim 24, wherein said media player component and said primary metadata repository of said local user agent are configured to honor restrictions on media rights imposed by at least one technology.

26. The unified media collection system of claim 20, further comprising said local user agent adapted to communicate with at least one online merchant.

27. The unified media collection system of claim 26, wherein said local user agent is adapted to compare and keep its metadata up-to-date and synchronized with said at least one online merchant.

28. The unified media collection system of claim 27, wherein said local user agent is adapted to subscribe to online merchant metadata changes.

29. The unified media collection system of claim 28, wherein said local user agent calls a respective API exposed by said at least one online merchant to ingest metadata due to purchase of new content from said at least one online merchant.

30. The unified media collection system of claim 27, wherein said synchronization entails a comparison between physical content associated with a collection that exists locally with content available from said at least one online merchant for said collection.

31. The unified media collection system of claim 30, wherein said local user agent is adapted to purchase and ingest missing content about said collection from said at least one online merchant with a single interaction to complete its media collection.

32. The unified media collection system of claim 20, further comprising at least one remote secondary metadata repository.

33. The unified media collection system of claim 32, wherein said at least one remote secondary metadata repository contains logical metadata for all existing missing content.

34. The unified media collection system of claim 33, wherein said local user agent calls a respective API exposed by said at least one remote secondary metadata repository to compare and keep said primary metadata repository synchronized and up-to-date with a third party providing online access to said at least one remote secondary metadata repository.

35. A method for consolidating and unifying logical and physical metadata about media content from a plurality of sources, said method comprising the steps of:
(a) launching a local user agent;
(b) checking for new content in at least one foreign user agent by said local user agent, said local user agent subscribing to metadata changes from said at least one foreign user agent;
(c) importing and translating metadata for new content from the format used by said at least one foreign user agent into format used by said local user agent if there is new content in said at least one foreign user agent; and
(d) propagating the imported metadata by said local user agent to other user agents.

36. The method of claim 35, further comprising the repeat of step (b) for a second foreign user agent.

37. A method for consolidating and unifying logical and physical metadata about media content from a plurality of sources, said method comprising the steps of:
(a) launching a local user agent, said local user agent including a media player and a primary metadata repository;
(b) checking for new content in at least one foreign user agent by said local user agent, said local user agent subscribing to metadata changes from said at least one foreign user agent;
(c) checking for new content introduced directly to said local user agent by said local user agent if there is no new content in said at least one foreign user agent;
(d) translating new metadata if new content has been introduced directly to said local user agent by said local user agent;
(e) checking if any new content has been discovered in any of the file system directories subscribed to by said local user agent if no new content has been introduced directly to said local user agent;
(f) enumerating newly discovered content;
(g) checking whether the enumerated new content has inherent logical metadata;
(h) retrieving physical metadata from the enumerated new content if no inherent logical metadata is found; and
(i) importing new logical metadata into said primary metadata repository if inherent logical metadata is found.

38. The method of claim 37, further comprising the step of sending an inquiry whether said local user agent should be closed if no new content is discovered.

39. The method of claim 38, further comprising the step of closing said local user agent if an affirmative response is received.

40. The method of claim 39, further comprising the step of running said media player component to play or browse stored media if a negative response is received.

41. A unified media collection system, comprising;
a local user agent with a primary metadata repository, said local user agent having a media player; and
at least one foreign user agent with a secondary metadata repository operatively coupled to said primary metadata repository, said local user agent configured to compare said primary and secondary metadata repositories to identify missing media content available for purchase, and purchase at least a portion of the identified missing media content to further complete at least one media collection.

42. The unified media collection system of claim 41, wherein said local user agent is adapted to deselect items from a list of identified missing media content for purchase.

* * * * *